Figure 1:
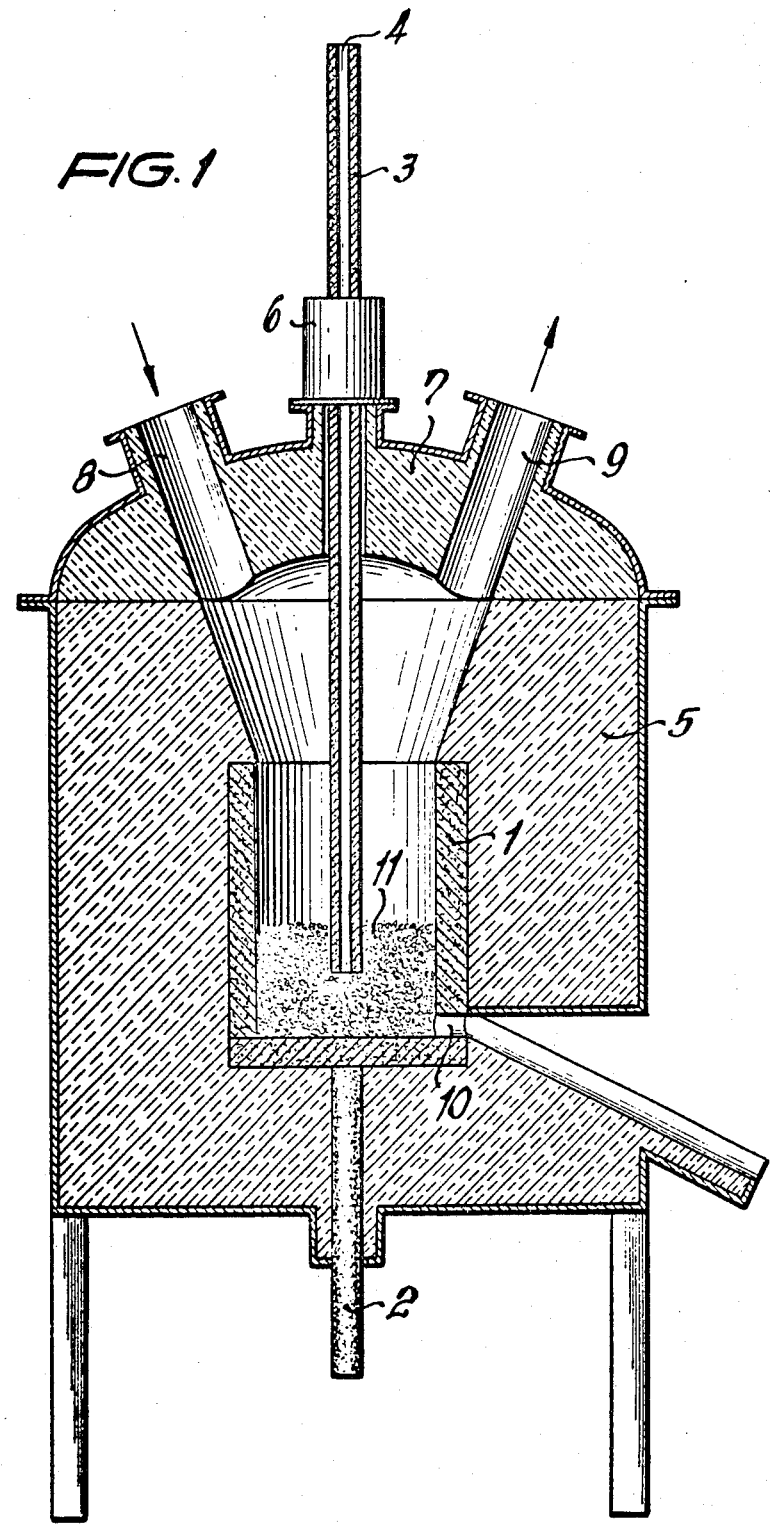

United States Patent [19]

Meurer et al.

[11] 3,723,608
[45] Mar. 27, 1973

[54] PRODUCTION OF PHOSPHORUS

[75] Inventors: Peter Lorenz Meurer, Herdecke-Ende; Friedrich Wilhelm Dorn, Hermulheim; Heinz Harnisch, Lovenich, all of Germany

[73] Assignee: Knapsack Aktiengesellschaft, Knapsack near Cologne, Germany

[22] Filed: Feb. 17, 1971

[21] Appl. No.: 116,167

[30] Foreign Application Priority Data

Mar. 24, 1970 Germany.....................P 20 14 014.1

[52] U.S. Cl..................................................423/322
[51] Int. Cl..............................................C01b 25/02
[58] Field of Search...............23/223, 1 F; 423/322

[56] References Cited

UNITED STATES PATENTS

| | | | |
|---|---|---|---|
| 2,675,307 | 4/1954 | Klugh | 23/223 X |
| 3,010,796 | 11/1961 | Alexander et al. | 23/223 |
| 3,353,917 | 11/1967 | Harris | 23/223 |

FOREIGN PATENTS OR APPLICATIONS

| | | | |
|---|---|---|---|
| 1,004,382 | 9/1965 | Great Britain | 23/223 |
| 1,246,780 | 8/1967 | Germany | |

Primary Examiner—Earl C. Thomas
Assistant Examiner—Charles B. Rodman
Attorney—Connolly & Hutz

[57] ABSTRACT

Production of phosphorus by reaction of a mixture comprising calcium phosphate, quartz sand and coke. The reaction is effected at 1,300° to 1,700° C by electrical heating in an autogenous bed of fluidized coke. The coke is used in particles with a size of 0.1 to 5 mm, and each of the calcium phosphate, quartz sand and coke components forming the mixture is used in particles with a size of 0.01 to 5 mm. The reduction furnace used in carrying out this process is comprised of a carbon furnace vessel which is fitted with at least one movable electrode projecting into it from above, a refractory heat insulation encapsulating the furnace vessel, at least one raw material inlet, at least one outlet for removal of furnace gas containing phosphorus and carbon monoxide, at least one tapping hole in the bottom portion of the vessel and the heat insulation encapsulating the vessel, for tapping off slag and ferrophosphorus.

5 Claims, 2 Drawing Figures

PRODUCTION OF PHOSPHORUS

The present invention relates to the production of phosphorus by the reaction of calcium phosphate, quartz sand and coke.

Various proposals have already been made to produce phosphorus by reducing calcium phosphates with carbon in the presence of quartz sand in accordance with the following equation (simplified):

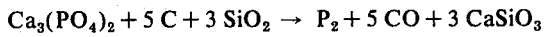

$$Ca_3(PO_4)_2 + 5 C + 3 SiO_2 \rightarrow P_2 + 5 CO + 3 CaSiO_3$$

in a fluidized or fluid bed rather than with the use of lumpy raw materials in an electric low-built shaft furnace. An auxiliary gas is normally required to be used for producing a fluidized bed and this results in the evolution of considerably increased quantities of issuing gas which awaits finishing treatment. This is the reason why these earlier processes have not been reduced to practice heretofore.

More particularly, such process has, for example, been described in U.S. Pat. No. 3,247,014, Example 3, and claimed in claims 15 and 16. A fluid bed of slag is used therein, and fresh slag, which is continuously formed, is removed therefrom in granular rather than in liquid form. Calorific energy is supplied by means of a plasma stream of CO-gas.

A similar process using a fluidized bed reactor with plasma heating, wherein the plasma gas is argon which is ionized at the high temperatures prevailing and by applying voltage, has been disclosed in the journal "Chemie-Ingenieur-Technik," 38 (1966), volume 4, page A 447. The resulting "plasma" predominantly supplies heat to the tip of the electrode and the surface of the fluidized bed. This process is, however, not fully satisfactory and is a commercially unattractive procedure for its use of tungsten electrodes which are subject to rapid wear.

British Patent 1 004 382 relates to the production of phosphorus without the addition of quartz sand. This is an attempt to avoid the formation of slag which is said to forbid maintenance of the fluidized bed condition in the furnace. This process uses a fluid carbon bed, which is traversed by an electric current and required to be maintained by the continuous introduction of an inert gas, from below.

U.S. Pat. No. 3,118,734 uses a mixture of flux and ores, wherein the carbon is replaced by a hydrocarbon. This latter is cracked at high temperatures and then provides carbon coating the fluid bed of $SiO_2$. Once again, the bed is continuously fluidized by the introduction of nitrogen from below, and solid slag is removed therefrom.

U.S. Pat. No. 3,056,659 describes a fluid bed process which, however, is not electrically heated by passing an electric current therethrough, but by means of a hot gas. Again, the furnace is fed with a hydrocarbon which is cracked to furnish carbon.

U.S. Pat. No. 2,974,016 relates to a blast furnace process in a fluid bed in the absence of electrodes, and the reaction gas of CO + P is used as the heating gas therein. The resulting phosphorus is required to be recovered from a particularly large quantity of gas. The mixture of flux and ores is free from quartz sand. This process is said to be unworkable in British Patent 1 004 382.

In all of these earlier processes, the residue (slag) freed from phosphorus is removed in solid rather than in liquid form from the reactor. Removing the residue in the form of liquid slag would be a simpler and more economic procedure as it would then be possible to add quartz sand thereto and thereby to increase the yield of phosphorus. However, all of these earlier processes use customary fluid bed reactors which have passageways or openings disposed in their bottom portions for the supply of auxiliary gas necessary to fluidize the material placed in the reactor, and specifically heavy liquid slag dropping down therein would soon render these passageways or openings impermeable to the auxiliary gas. The fact that the auxiliary gas is used in a quantity approximately as large as the quantity of gas evolved during phosphate reduction entails further expenditure on subjecting the gas issuing from the furnace and having phosphorus therein to finishing treatment.

It is accordingly an object of the present invention to provide a process for the production of phosphorus comprising reducing phosphate ores by means of carbon and with the addition of quartz sand in a fluidized bed reactor and removing resulting slag in liquid form therefrom, without the need to use an auxiliary gas for fluidization of the fluid bed. It has already been suggested (cf. German published Specification 1 246 780) that the gas evolved in reduction reactions for the production of metals, e.g. iron from iron ore and coke, be used for fluidization of the bed in which the reaction occurs. Significant differences have, however, been found to exist between firstly metal production and secondly phosphorus production, with respect to the mechanical properties of the ores and with respect to the course of the reactions. In view of this, it clearly has not been obvious to try the process of the above German Specification in the production of phosphorus. We have now found, however, that by the selection of a suitable particle size for the raw material and by the selection of a suitable temperature it is possible also to effect phosphate reduction in an electrically heated fluid bed reactor, wherein the bed is fluidized solely by means of reaction gas (this is termed an autogenous fluidized bed), and resulting slag is removed in liquid form.

The principle underlying the process of the present invention will now be described in greater detail.

Placed on the bottom of a furnace vessel of carbon (e. g. graphite, coal) is a layer of fine particulate coke, and one or more electrodes supplying electrical energy are arranged to project thereinto. The coke bed itself is the heat resistance by which the bed is electrically heated to a temperature of about 1,500° C. On setting the furnace to work, an auxiliary gas, e. g. nitrogen, is injected, e.g. through an electrode fitted with a longitudinal bore, into the layer of coke so as to produce a fluidized bed. After the reaction temperature has been reached, a fine particulate mixture of phosphate ore, coke breeze and quartz sand is regularly distributed over the fluid coke bed. At the same time, the supply of electrical energy is increased to the value set by the rate at which the mixture is added, and the supply of auxiliary gas is arrested. A smooth reaction occurs with the resultant formation of a reaction gas consisting of phosphorus and carbon oxide, which is used for fluidizing the fluid bed, and liquid slag. The phosphorus is recovered from the reaction gas by conventional condensation. Slag accumulates under the fluid coke bed and is removed.

During the reaction, the bed of fluidized coke should conveniently be maintained at temperatures of between about 1,300° C and about 1,700° C by regulation of the relation existing between the supply of electrical energy and mixture of ores and fluxes. At temperatures lower than about 1,300° C, the slag is difficult to remove from the furnace, and the $P_2O_5$-concentration in the slag is found to increase. Fluid bed temperatures significantly higher than about 1,700° C may entail side-reactions, e. g. the formation of silicon carbide, which means additional expenditure of raw materials and energy.

For a given particle size of the coke forming the fluidized bed, it is possible to vary within two limiting values the throughput rate of the mixture and hence the velocity of flow of the gas in the fluid bed. The lower limiting value for the throughput rate approximately corresponds to the lower disintegration rate of the fluid bed, and the upper limiting value corresponds to the limit ejection velocity of the fluid bed from the reactor. These limiting values of the throughput rate (based on the cross-sectional area of the fluidized bed and the quantity of phosphorus introduced together with the mixture) approach 40 or 200 kg P/square meter, per hour, for a coke particle size of between 0.5 and 1 mm in the fluidized bed, and 80 or 400 kg P/square meter, per hour, for a particle size of between 1 and 1.5 mm.

An exemplary embodiment of a reduction furnace operated with an autogenous fluid bed in accordance with the present invention will now be described in greater detail with reference to FIG. 1 of the accompanying drawings.

The reduction furnace comprises a graphite crucible 1 and a lower graphite electrode 2 which projects into the bottom portion of crucible 1. A movable upper graphite electrode 3 projects into crucible 1 from above. Electrode 3 may be formed with a longitudinal channel 4 (hollow electrode) or the passage of inert gas therethrough. Crucible 1 and lower electrode 2 are encapsulated by a refractory, heat-insulating mass 5. The upper electrode 3, which is movable in vertical direction, slides in an electrode holder 6. The reduction furnace also comprises a detachable cover 7 which is fitted with a raw material inlet 8 and a gas outlet 9 for the removal of furnace gas containing phosphorus and carbon monoxide. Crucible 1 is further fitted in its bottom portion with a tapping hole 10 for the removal of slag. Reference numeral 11 denotes the bed of fluidized coke in crucible 1.

Figure 2:
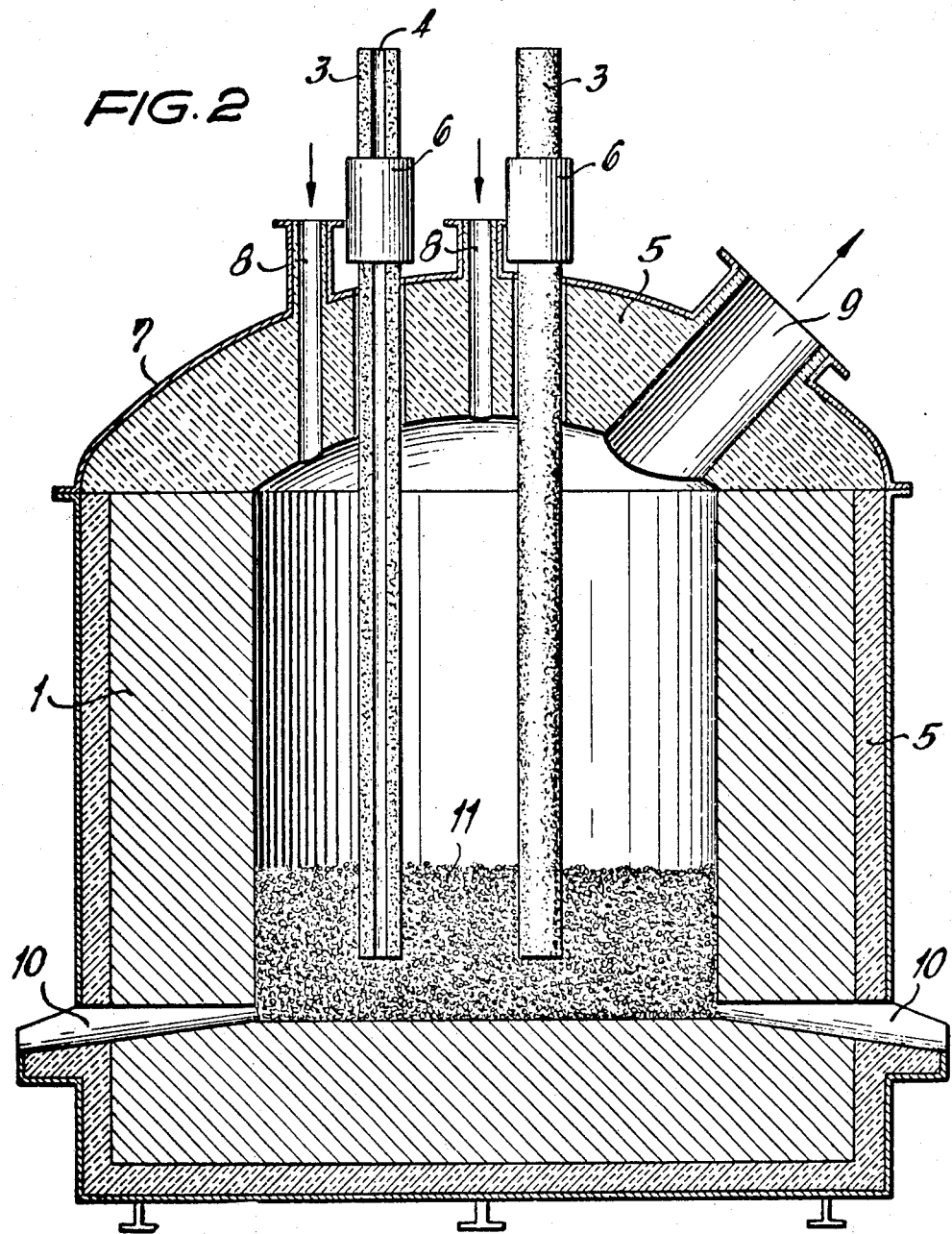

A further exemplary embodiment of a reduction furnace designed in accordance with the present invention is shown in FIG. 2 of the accompanying drawings, wherein the numerals denote the same structural parts as in FIG. 1, save that numeral 1 denotes a furnace vessel of carbon bricks, and save that numeral 2 has been omitted as the fixed lower electrode is here replaced by a further movable electrode 3.

The present invention relates more particularly to a process for the manufacture of phosphorus by reaction of a mixture comprising calcium phosphate, quartz sand and coke, which comprises effecting the reaction at temperatures of between 1,300° and 1,700° C by electrical heating in an autogenous bed of fluid coke, the coke particles having a size of between 0.1 and 5 mm, and each of the said calcium phosphate, quartz sand and coke components forming the said mixture being used in particles with a size of between 0.01 and 5 mm.

Needless of say it is also possible to use up to about 5 weight percent of the individual components forming the above mixture in the form of particles having a size smaller than 0.01 mm, as the removal of such undersize material would be a too costly procedure.

Further preferred embodiments of the process of the present invention comprise:

a. initiating the process by feeding a reduction furnace with coke so as to produce a bed of coke therein; effecting continuous fluidization of the coke bed by feeding the furnace with an auxiliary gas, which preferably is nitrogen or carbon oxide; electrically heating the coke bed and furnace to reaction temperature; starting introduction of the mixture of ores and fluxes; and arresting the supply of auxiliary gas to the furnace simultaneously with or shortly after the introduction of the said mixture of ores and fluxes;

b. introducing the auxiliary gas into the reduction furnace through a hollow electrode or lance;

c. introducing the fine particulate mixture of ores and fluxes into the reduction furnace, which is preheated to reaction temperature, contains the fluidized coke bed and is traversed by electrical current; continuously removing resulting reaction gases, which contain phosphorus and carbon monoxide and autogenously fluidize the bed of coke and the mixture of ores and fluxes; recovering pure phosphorus from the said reaction gas; and removing accumulating liquid slag and ferrophosphorus through the bottom of the reduction furnace. The reduction furnace of the present invention for the production of phosphorus in an autogenous fluidized bed comprises a furnace vessel of carbon material; at least one movable electrode projecting into the furnace vessel from above; a refractory heat insulation encapsulating the furnace vessel; at least one raw material inlet; at least one outlet for the removal of furnace gas containing phosphorus and carbon monoxide; and at least one tapping hole in the bottom portion of the furnace vessel and the heat insulation encapsulating the said vessel, for tapping off slag and ferrophosphorus. One or more of the movable electrodes may be hollow electrodes.

EXAMPLE 1

The furnace vessel shown in FIG. 1, which had an internal diameter of 40 cm, was fed with 30 kg powdered coke having a particle size of between 0.5 and 1 mm. By applying a voltage of about 70 volts between the upper movable electrode and the lower electrode projecting into the bottom of the furnace vessel, and by the simultaneous injection of about 30 normal cubic meters/hr (S.T.P.) of nitrogen through a central passageway provided in the movable electrode, the furnace was gradually heated to reaction temperature until the bed of fluidized coke was at a temperature of about 1,500° C. Following this, a mixture comprised of 70.6 kg calcined phosphate ore (33.0 % $P_2O_5$, 41.0 % CaO, 6.2 % CaF, 10.4 % $SiO_2$; particles of between 0 and 0.5 mm in size), 11.4 kg coke (particles of between 0 and 1 mm in size) and 18.0 kg quartz sand (particles of between 0.2 and 0.4 mm in size) was uniformly introduced within 60 minutes, through the raw material inlet. During that time, the quantity of nitrogen supplied through the passageway in the electrode was reduced down to 2 normal cubic meters per hour. This small quantity of gas prevented the passageways from becoming clogged. The furnace voltage was 83 volts and power was supplied at the rate of 168 kwh. The gas evolved in the furnace during reduction of the phosphate, which substantially consisted of CO and $P_2$, was delivered through a dust separator to a condensation tower, in which it was scrubbed with water and freed from phosphorus. The supply of raw material was arrested, the supply of current was discontinued and the slag, which was found to have been formed in the furnace, was removed in liquid form through the slag tapping hole. 61.0 kg slag (including ferrophosphorus) containing 0.5 % $P_2O_5$ were tapped off together with 5.5 kg filter dust containing 13.3 % $P_2O_5$. For a throughput of 10.2 kg P/hour, the loss in $P_2O_5$ caused by the removal of slag was 1.4 percent, based on the quantity of $P_2O_5$ contained in the raw material.

EXAMPLE 2

The procedure was the same as that described in Example 1, save that the furnace was fed with 122.7 kg phosphate ore (particles of between 0 and 0.5 mm in size), 19.8 kg coke (particles of between 0 and 1 mm in size) and 31.3 kg quartz sand (particles of between 0.2 and 0.4 mm in size). The mixture was added within 65 minutes and 270 kwh electrical energy were consumed for a furnace voltage of 112 volts. Following the addition of the above mixture, there were tapped off 112 kg slag (including ferrophosphorus) containing 0.21 % $P_2O_5$ together with 7.6 kg filter dust containing 16.0 % $P_2O_5$. For a throughput of 16.3 kg P/hour, the loss in $P_2O_5$ caused by the removal of slag was 0.6 percent, based on the quantity of $P_2O_5$ contained in the raw material.

EXAMPLE 3

The procedure was the same as that described in Example 1, save that the furnace was fed with 94.3 kg phosphate ore (particles of between 0 and 2 mm in size), 15.3 kg coke (particles of between 0 and 1 mm in size) and 22.1 kg quartz sand (particles of between 0.2 and 0.4 mm in size), which were introduced within 75 minutes into the bed of fluidized coke in the furnace. The furnace voltage was 95 volts and 192 kwh energy were consumed. The slag tapped off following introduction of the mixture of ores and fluxes contained 0.7 % $P_2O_5$. For a throughput of 11.2 kg P/hour, the loss in $P_2O_5$ caused by the removal of slag was 2.0 percent, based on the quantity of $P_2O_5$ contained in the raw material.

EXAMPLE 4

The procedure was the same as that described in Example 1, save that the furnace was fed with 134.1 kg phosphate ore (particles of between 0 and 1 mm in size), 21.7 kg coke (particles of between 0 and 1 mm in size) and 34.2 kg quartz sand (particles of between 0.2 and 0.4 mm in size), which were uniformly fed within 55 minutes. The furnace voltage was 110 volts and 246 kwh were consumed during that time. 110 kg slag (including ferrophosphorus) containing 0.3 % $P_2O_5$ were tapped off. For a throughput of 21.1 kg P/hour, the loss in $P_2O_5$ caused by the removal of slag was 0.8 percent, based on the quantity of $P_2O_5$ contained in the raw material.

We claim:

1. A process for the manufacture of phosphorus by reaction of a mixture comprising calcium phosphate, quartz sand and coke in a furnace by means of a fluidized bed of coke particles, which comprises initiating the formation of the fluidized bed of the coke particles with a size of between 0.1 and 5 mm by feeding the furnace with an auxiliary gas, electrically heating the fluidized bed of coke particles to temperatures of between 1,300° and 1,700° C, introducing the mixture of calcium phosphate, quartz sand and coke essentially consisting of particles with a size of between 0.01 and 5 mm into the fluidized bed of coke particles, arresting the supply of auxiliary gas to the furnace as soon as resulting reaction gases commence to autogenously fluidize the fluidized bed of coke particles and the introduced mixture, utilizing said reaction gases for directly autogenously fluidizing said bed, removing the reaction gases containing phosphorus and carbon monoxide near the head of the furnace, recovering pure phosphorus from the reaction gases and removing liquid slag and ferrophosphorus accumulating at the bottom of the furnace.

2. The process as claimed in claim 1, wherein the auxiliary gas is nitrogen.

3. The process as claimed in claim 1, wherein the auxiliary gas is carbon oxide.

4. The process as claimed in claim 1, wherein the auxiliary gas is introduced into the furnace through a hollow electrode.

5. The process as claimed in claim 1, wherein the auxiliary gas is introduced into the furnace through a lance.

* * * * *